US 8,209,677 B2

(12) United States Patent
Shintani et al.

(10) Patent No.: US 8,209,677 B2
(45) Date of Patent: Jun. 26, 2012

(54) BROADCAST DOWNLOAD SYSTEM VIA BROADBAND POWER LINE COMMUNICATION

(75) Inventors: Peter Shintani, San Diego, CA (US); Ryuichi Iwamura, San Diego, CA (US)

(73) Assignees: Sony Corporation, Tokyo (JP); Sony Electronics, Inc., Parkridge, NJ (US)

( * ) Notice: Subject to any disclaimer, the term of this patent is extended or adjusted under 35 U.S.C. 154(b) by 1118 days.

(21) Appl. No.: 11/805,029

(22) Filed: May 21, 2007
(Under 37 CFR 1.47)

(65) Prior Publication Data

US 2008/0295091 A1   Nov. 27, 2008

(51) Int. Cl.
*G06F 9/44* (2006.01)
(52) U.S. Cl. ......... 717/172; 717/169; 717/175; 717/177
(58) Field of Classification Search .................. 717/172, 717/169, 175, 177; 340/12.32; 455/402
See application file for complete search history.

(56) References Cited

U.S. PATENT DOCUMENTS

| | | | |
|---|---|---|---|
| 6,281,784 B1 * | 8/2001 | Redgate et al. | 340/12.33 |
| 6,532,268 B1 * | 3/2003 | Morisawa | 375/257 |
| 7,173,935 B2 * | 2/2007 | Lou et al. | 370/395.5 |
| 7,664,117 B2 * | 2/2010 | Lou et al. | 370/395.5 |
| 7,738,612 B2 * | 6/2010 | Rafaeli | 375/354 |
| 7,764,943 B2 * | 7/2010 | Radtke | 455/402 |
| 7,770,165 B2 * | 8/2010 | Olson et al. | 717/168 |
| 8,086,702 B2 * | 12/2011 | Baum et al. | 709/220 |
| 2002/0138567 A1 * | 9/2002 | Ogawa | 709/203 |
| 2002/0188934 A1 * | 12/2002 | Griffioen et al. | 717/170 |
| 2003/0062990 A1 * | 4/2003 | Schaeffer et al. | 340/310.01 |
| 2003/0221190 A1 | 11/2003 | Deshpande et al. | |
| 2004/0015570 A1 | 1/2004 | Daum et al. | |
| 2004/0143828 A1 * | 7/2004 | Liu et al. | 717/168 |
| 2004/0267383 A1 | 12/2004 | Bicknell et al. | |
| 2005/0080879 A1 | 4/2005 | Kim et al. | |
| 2005/0111533 A1 * | 5/2005 | Berkman et al. | 375/220 |
| 2005/0181839 A1 | 8/2005 | Tiainen et al. | |
| 2005/0200459 A1 * | 9/2005 | White, II | 340/310.01 |
| 2006/0038662 A1 * | 2/2006 | White et al. | 340/310.11 |
| 2006/0143600 A1 * | 6/2006 | Cottrell et al. | 717/168 |

(Continued)

FOREIGN PATENT DOCUMENTS

| | | |
|---|---|---|
| EP | 152871 | 8/1985 |
| JP | 26195766 | 7/2006 |

OTHER PUBLICATIONS

Mundi "PLC-WIFI Hybrid Broadband Internet: Deployment and Security", University of Florida, 2004.*

(Continued)

*Primary Examiner* — Phillip Nguyen (57) ABSTRACT

A method of providing a software patch to an electronic device. A device containing a software patch for an electronic device may be plugged to an electrical outlet. A plurality of electronic devices may be queried, over a power line through the electrical outlet, for identifying the electronic device requiring the software patch. As a result, the electronic device requiring the software patch may also identify the version of the firmware installed on the electronic device. Test signals may be sent over the power line to determine the signal quality of various multiple carriers for using OFDM scheme. Suitability of various sub-carriers for sending the software patch over the power line may be determined. Higher density modulation may be used for higher quality sub-carriers to send the software patch to the electronic device. An acknowledgment signal for receipt of the properly received authenticated software patch may be received.

21 Claims, 5 Drawing Sheets

U.S. PATENT DOCUMENTS

2007/0101365 A1    5/2007  Clark et al.
2007/0188954 A1*   8/2007  Wiese et al. .................... 361/62
2007/0263716 A1*  11/2007  Huang et al. .................. 375/240

OTHER PUBLICATIONS

Kang et al. "Design and Implementation of Network Management System for Power Line Communication Network", IEEE, 2007.*

Li et al., "The Design and Implementation of Home Network System Using OSGi Compliant Middleware", May 2004, IEEE, vol. 50, No. 2.*

Lloyd et al., "Reinventing Home Automation: A Reliable, Cost Effective Approach", 2007.*

* cited by examiner

BROADCAST DOWNLOAD SYSTEM VIA BROADBAND POWER LINE COMMUNICATION

TECHNICAL FIELD

Embodiments of the present invention relate to the field of electronics. More particularly, embodiments of the present invention relate to a broadcast download system via broadband power line communication.

BACKGROUND ART

The growing use of electronics has led to an increase use of microprocessors and firmware in almost every appliance. For example, appliances including refrigerators, washing machines, dishwashers and etc. may be controlled using a microprocessor and a firmware integrated therein.

An increase in growth and in use of microprocessors has increased the need to reconfigure appliances supported by microprocessors. In general, to reconfigure appliances, a technician's physical access to the actual appliance is needed. Not only accessing the appliance is inconvenient for the owner by requiring the individual to be at home during the service call, but it is inconvenient for the technician since in many cases the electronic device may be heavy and hard to move in order to get access to a port for reconfiguring the electronic device.

One conventional method is to reconfigure appliances using the Internet. Unfortunately many appliances are not equipped with Internet connection in order for their microprocessors or memory to be reconfigured. Moreover, even if an appliance is equipped to be Internet operable, it is in general difficult to provide an Internet connection using conventional communication lines (e.g., through digital subscriber line (DSL), Cable, Satellite and etc.) to every appliance in a residential home since the Internet connection is generally not available throughout a residence. As such, appliances residing in the room with the Internet connection are the only appliances that can be reconfigured in this fashion.

One conventional method provides reconfiguration for the appliance by communicating over a power line. In general, power transmission requires transformers for transferring power over the power line. However, transformers behave as a low pass filter, thereby filtering out high frequency data. In one conventional method, data is being aggregated at a medium voltage or low voltage point with power transmission. However, to avoid being filtered out, prior to arrival at a transformer, data is being extracted and once again aggregated after power itself is sent through transformers.

Unfortunately, extracting and aggregating data at each transformer is very inefficient. Moreover, aggregating data requires an alternative connection to the data provider, e.g., through a DSL line, Cable and etc. for providing data for transmission and aggregation. Furthermore, power lines are in general not capable of providing high speed data transmission and they are susceptible to interference. As a result, while data transmission for a small amount of data may be sufficient, this type of transmission are not suitable for updating and patching software programs on a television and a set-top-box since software programs for more sophisticated electronic devices tend to be quite large in size.

Accordingly, providing data through power lines may only be suitable for providing reconfigurable appliance control supported by simple appliances (e.g., dishwasher, washer/dryer and etc.). Additionally, federal regulations have limited the strength of the data signal that can be injected onto power lines, thereby providing additional constraint on the communication system.

Another conventional method may reconfigure appliances by communicating to a controller via an Internet using conventional connections (e.g., DSL, Cable and etc.) and using a power line communication to supply the reconfiguration to the appliance thereafter. However, this conventional method is merely for controlling appliances and requires connection via an Internet using conventional communication channels (e.g., DSL, Cable and etc.). Unfortunately, many residential homes do not have access to the Internet using conventional communication channels. For example, this method would be extremely problematic and inconvenient in developing countries and third world countries.

In general, sophisticated electronics such as televisions and set-top-boxes, to name a few, need complicated programming software. Most electronics have short cycle designs, which translate to short testing time. As a result, electronic devices are often shipped to customers even though their programming software contains programming bugs. Unfortunately, it is difficult to update software programs used by highly sophisticated electronic devices since most of these devices are unable to be updated through the Internet using conventional methods (e.g., DSL, Cable and etc.) for the reasons discussed above. Moreover, it is difficult to update software programs used by highly sophisticated electronics through a power line transmission since the software programs are in general large in size and the power line transmission is slow for transmitting large amount of data.

SUMMARY

Accordingly, a need has arisen to provide a method and system for providing patching software for highly sophisticated electronic devices (e.g., television set, set-top-box and etc.) without requiring access to the Internet using conventional methods (e.g., digital subscriber line (DSL), Cable and etc.). Moreover, a need has arisen to provide a method for updating software patches for sophisticated electronic devices without requiring access to the Internet and without requiring the technician to physically access the electronic device. As such, a need has arisen to provide an update for patching software programs using high power transmission lines, wherein patching software programs are transmitted at high frequency and at high data rate. It will become apparent to those skilled in the art in view of the detailed description of the present invention that the embodiments of the present invention remedy the above mentioned needs.

In one embodiment of the present invention a device containing a software patch for an electronic device (e.g., television set, set-top-box and etc.) may be plugged into an electrical outlet for a residential home. It is appreciated that the electrical outlet may be inside and/or outside of the residence. Once the device is plugged into the electrical outlet, it may query a plurality of electronic devices for their identification in order to identify the electronic device that requires the software patch. It is appreciated that the query may be over a power line through the electrical outlet to which the device is coupled.

According to one embodiment, the electronic device (e.g., television set, set-top-box and etc.) requiring the software program patch responds by sending a signal to the querying device. It is appreciated that the response to the query may be sent over the same power line and received by the querying device through the electrical outlet to which the device is coupled.

Accordingly, the device is operable to identify the electronic device requiring the software program patch (e.g., television set, set-top-box and etc.). In one embodiment, the device may also determine the version of the firmware and other relevant information installed on the electronic device. As a result, the device may send the software patch to the electronic device. It is appreciated that the software patch may be sent over the power line through the electrical outlet to which the device is coupled and that the software patch may update the firmware on the electronic device.

It is appreciated that in one embodiment, prior to sending the patching software, the device may send at least one testing signal to determine the signal quality of various multiple carriers over the power line. As a result, the device is operable to determine at least one suitable carrier for sending the software patch over the power line. It is appreciated that according to one embodiment, the signal quality may be determined using the signal to noise ratio of various carriers over the power line. Consequently, a more suitable sub-carrier (e.g., with higher signal to noise ratio) may be used for higher density modulation (e.g., 256 quadrature amplitude modulation (QAM)). Similarly, if a sub-carrier with lower quality is selected, a lower density modulation may be utilized (e.g., binary phase shift keying (BPSK)). It is appreciated that according to one embodiment, orthogonal frequency multiplexing (OFDM) for sending the software patch is used. Moreover, in one embodiment, the electronic device (e.g., television set, set-top-box and etc.) may send an acknowledgement signal to the device, thereby indicating the receipt of the properly authenticated software patch.

As a result, embodiments of the present invention eliminate the use of conventional communication over the Internet (e.g., DSL, Cable and etc.). Moreover, embodiments of the present invention provide a method and system for transmission of high frequency and high data rate information over power transmission lines. Consequently, the need for a technician to physically access the electronic device for providing a software patch is eliminated.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Reference will now be made in detail to embodiments of the present invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be evident to one of ordinary skill in the art that the present invention may be practiced without these specific details. In other instances, well known methods, procedures, components, and circuits have not been described in detail as not to unnecessarily obscure aspects of the invention.

Notation and Nomenclature

Some portions of the detailed descriptions which follow are presented in terms of procedures, steps, logic blocks, processing, and other symbolic representations of operations on data bits that can be performed on computer memory. These descriptions and representations are the means used by those skilled in the art to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities.

Usually, though not necessarily, these quantities take the form of electrical or magnetic signals capable of being stored, transferred, combined, compared, and otherwise manipulated in a computer system. It has proven convenient at times principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from following discussions, it is appreciated that throughout the present invention, discussions utilizing terms such as "processing" or "creating" or "transferring" or "executing" or "determining" or "instructing" or "issuing" or "halting" or "clearing" or "accessing" or "aggregating" or "obtaining" or "selecting" or "receiving" or "outputting" or "adjusting" or "sending" or "displaying" or "connecting" or "identifying" or "configuring" or "querying" or "transmitting" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Broadcast Download System via Broadband Power Line Communication

A method and system for providing software patch for sophisticated electronic devices (e.g., a television set, a set-top-box and etc.) through a power line via an electrical outlet are presented. In one embodiment, a technician may provide a software patch for a television set by simply coupling a device containing the software patch to an electrical outlet that may reside inside/outside of a residential home. It is appreciated that throughout this application, various references are made to a television set and a set-top-box for illustration purposes. However, it is appreciated that the method and system provided herein are equally applicable to other sophisticated electronic devices. As such, references to a television set and a set-top-box are exemplary and should not be construed as limiting the scope of the present invention.

Figure 1:
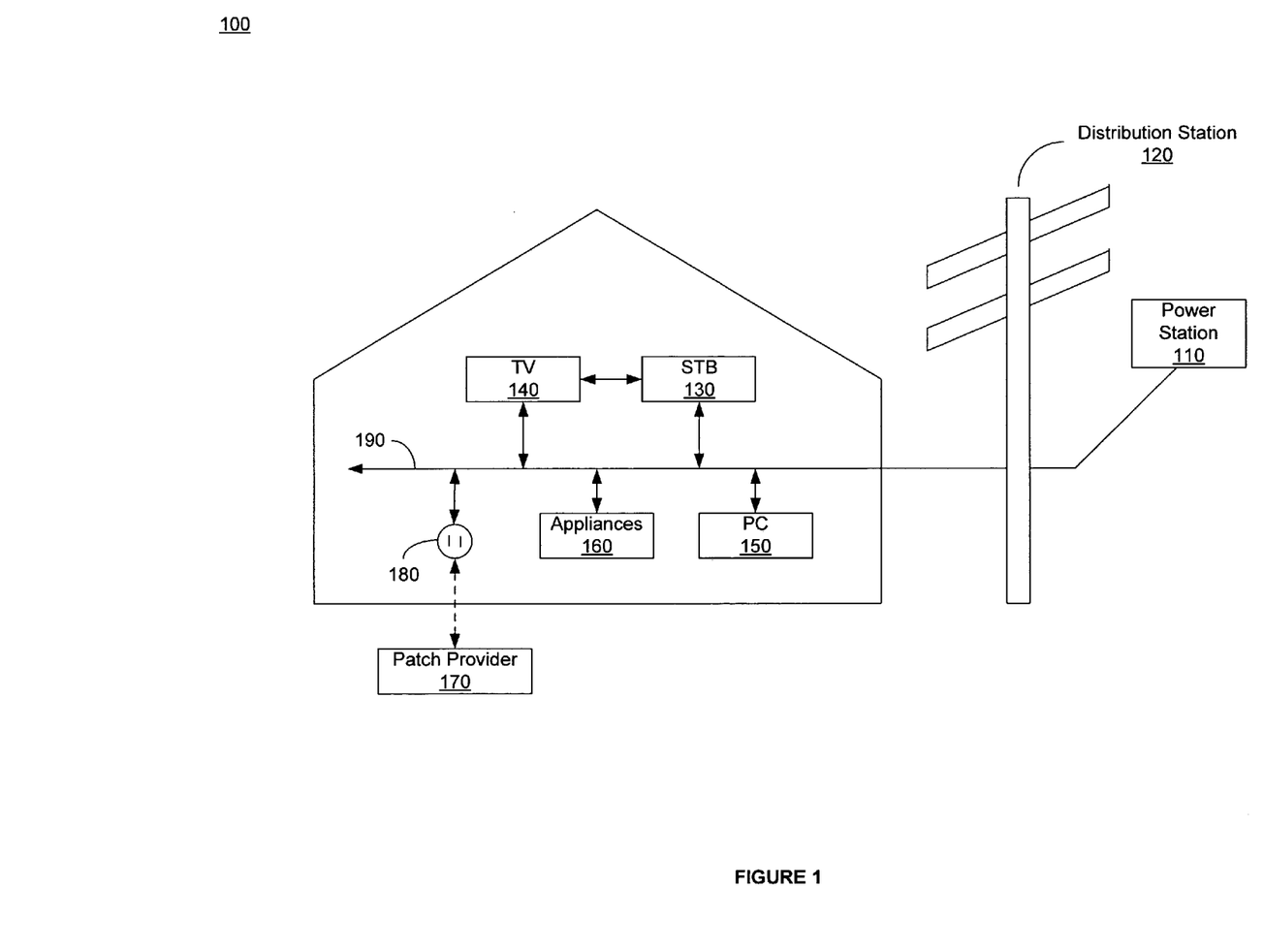
FIG. 1 shows an exemplary system for providing a software patch to an electronic device in accordance with one embodiment of the present invention.

Referring now to FIG. 1, an exemplary system 100 for providing a software patch to an electronic device in accordance with one embodiment of the present invention is shown. In one embodiment of the present invention, power is being transmitted from a power station 110 to a distribution station 120. Accordingly, the distribution station 120 may transform the power to a lower voltage. For example, power may be stepped down, using transformers, from a high voltage transmission to medium voltage and eventually to "low" voltage operable for use by appliances in a residential home.

In this example, various electronic devices may be coupled to the power line via electrical outlets. For example, a set-top-box 130 may be coupled to a power line 190 via an electrical outlet. Similarly, a television set 140, a personal computer 150 and other appliances (e.g., refrigerator, dishwasher, washer, dryer and etc.) may be coupled to the power line 190 via their corresponding electrical outlets. In order to provide a software patch for an electronic device (e.g., a television set 140, the set-top-box 130 and etc.), a technician may couple a device, a patch provider 170, containing the software patch to an electrical outlet 180. It is appreciated that the electrical outlet 180 may be inside/outside of a residential home.

Accordingly, the patch provider 170 may be used to transmit the software patch via the electrical outlet 180 through the power transmission line 190 to the electronic device needing the software patch, e.g., the television set 140. In one embodiment, the patch provider 170 may send a query over the power line 190 in order to identify the electronic device that needs the software patch.

Once a query is transmitted over the power line 190, the electronic device that needs the software patch, e.g., the television 140, may respond by sending a signal to the patch provider 170 via the power line 190. It is appreciated that more than one electronic device may respond to this query and identifies itself as the electronic device that needs the software patch. For example, two television sets having the same manufacturer, model and version may indicate the need for the software patch. Accordingly, the software patch may be provided to more than one electronic device when more than one electronic device identifies itself as the device needing the software patch.

The response sent to the patch provider 180 may not only identify the electronic device, but it may also identify the latest version of the software and firmware installed on the electronic device. As a result, the technician may be able to determine whether or not the electronic device requires the software patch. For example, if the patch provider 170 determines that the latest version of the firmware is already present and a software patch has been previously installed, providing the software patch may be aborted. In contrast, if the patch provider 170 determines that the latest version of the firmware is not present and a latest software patch has not been installed, then the software patch may be provided.

It is appreciated that in one embodiment of the present invention, an orthogonal frequency division multiplexing (OFDM) may be used to transmit the software patch over the transmission line 190. OFDM is a well known digital multi-carrier modulation scheme where multiple sub-carriers that are orthogonal may be used. Each sub-carrier may utilize a conventional modulation scheme (e.g., binary phase shift keying (BPSK), quadrature amplitude modulation (QAM) and etc.), to name a few.

The use of OFDM may be advantageous because OFDM is operable to be adapted to severe channel conditions, which may have significant advantage is noisy channels, e.g., power line 190, without requiring complex equalization. Moreover, OFDM is robust against narrowband co-channel interface, intersymbol interference (ISI) while achieving high spectral efficiency. OFDM may efficiently be implemented Fast Fourier Transform (FFT) and it has low sensitivity to time synchronization error.

Accordingly, in one embodiment, prior to sending the software patch over the power line 190, at least one test signal may be sent commonly known as a tone signal. The tone signal may be used to determine the signal quality of various sub-carriers. For example, power lines may have large dips in their frequency response which makes those frequencies unavailable for transmitting data. As a result of sending the tone signal, and analyzing the frequency response from the power line 190, frequency dips that are poor frequency sub-carriers for data transmission may be determined. Accordingly, frequencies for sub-carriers that are suitable for data transmission may be determined. In one embodiment, the suitability of a sub-carrier may be determined using the signal to noise ratio of the tone signal.

Accordingly, multiple sub-carriers that are suitable for data transmission may be determined by the patch provider 170. In one embodiment, the higher the quality of the sub-carrier (e.g., the higher signal to noise ratio), the higher density modulation may be used. For example, a very high signal to noise ratio sub-carrier may employ 256 QAM whereas a poor signal to noise ratio sub-carrier may use a lower density modulation, e.g., BPSK.

In one embodiment, since power line 190 conditions change continuously, a tone signal may be sent at regular intervals in order to modify the suitable sub-carriers to be used for transmission. For example, a tone signal may be transmitted every few minutes. Accordingly, OFDM may utilize an adaptive frequency modulation scheme based on the condition of the power line 190 channel, whereas conventional methods (e.g., CEBus and Lon Works) are not able to perform the adaptive frequency modulation scheme. It is appreciated that tone signals may be sent in any interval, therefore sending tone signals every few minutes is exemplary and should not be construed as limiting the scope of the present invention.

Accordingly, at least one suitable or multiple suitable sub-carriers may be determined such that the software patch can be transmitted to the electronic device (e.g., the television set 140). As a result, the patch provider 170 may modulate the software patch based on at least one suitable sub-carrier. The modulated software patch is then transmitted to the television set 140.

Figure 2:
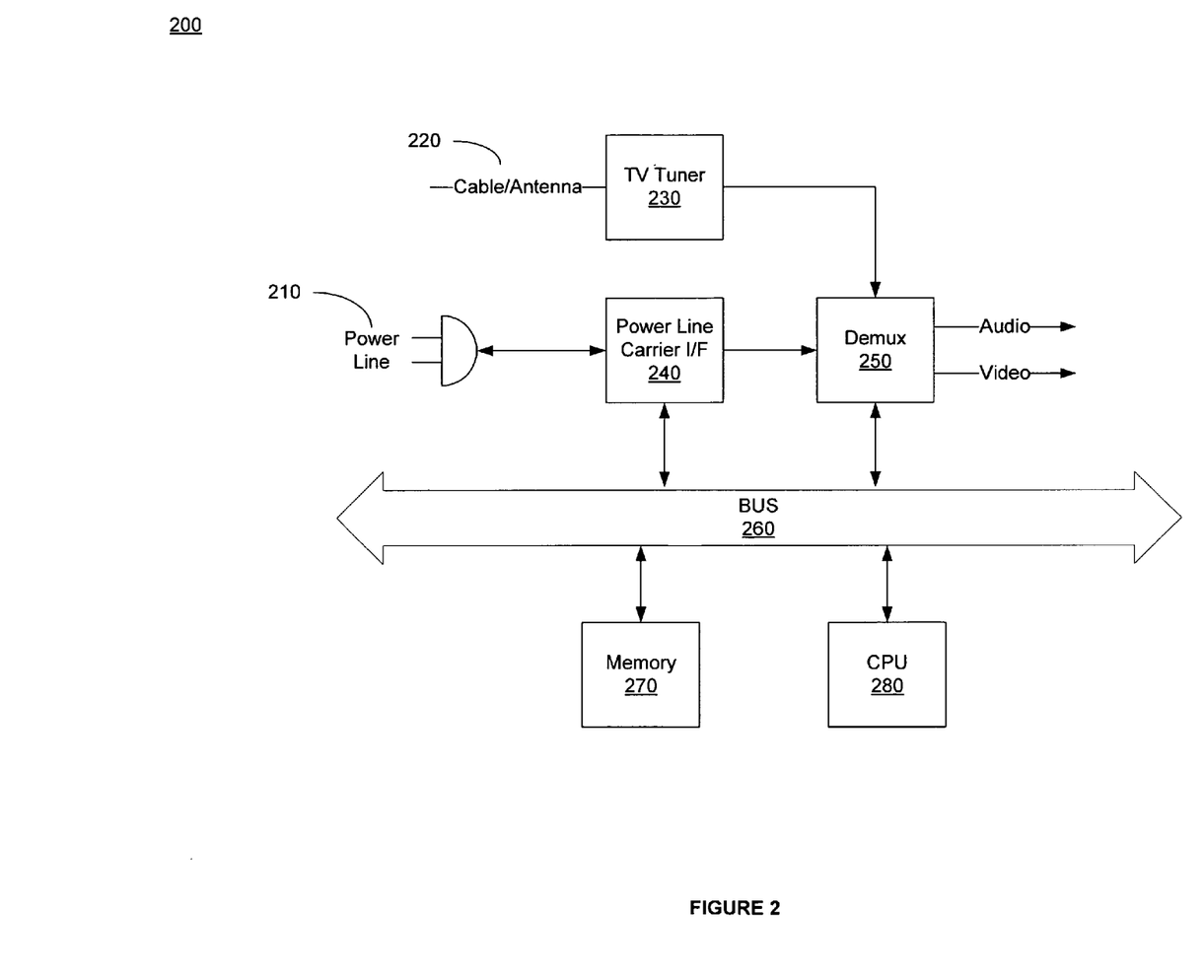
FIG. 2 shows an exemplary electronic device for receiving a software patch in accordance with one embodiment of the present invention.

Referring now to FIG. 2, an exemplary electronic device 200 for receiving a software patch in accordance with one embodiment of the present invention is shown. As discussed above, the electronic device 200 may be a television set, a set-top-box or any other sophisticated electronic device or consumer electronic equipment.

According to one embodiment, the television set 200 receives a power signal with a software patch provided by patch provider 170 through a power line 210 via an electrical outlet. It is appreciated that the electrical outlet for the television set 200 may be a different electrical outlet from the electrical outlet 180 to which the patch provider 170 is connected. The television set 200 may receive content through a cable/antenna 220 connection. A television tuner 230 may be used to decode, decrypt and descramble the content received through the cable/antenna 220 connection. The content may then be sent to a demultiplexer 250 for separating audio content and video content. In one embodiment, the demultiplexer 250 may also be coupled to a bus 260 for communicating with other electronic components.

The television set 200 receives power along with the software patch through the power line 210 at its power line carrier interface 240. The power line carrier interface 240 may be used to extract the software patch transmitted by the patch provider 170. Moreover, the power line carrier interface 240 may provide the power to the electronic components of the television set 220, e.g., the demultiplexer 250.

The extracted software patch may be sent over the bus 260 to other electronic components for updating the software or firmware used by the microprocessor of the television set 200. For example, the power line carrier interface 240 may send the software patch via the bus 260 to a CPU 280 and a memory component 270 for storing the software patch. As a result, the firmware and software used by the CPU 280 may be updated to remedy the bugs found in the software/firmware or it may provide for added functionality to the firmware.

Figure 3:
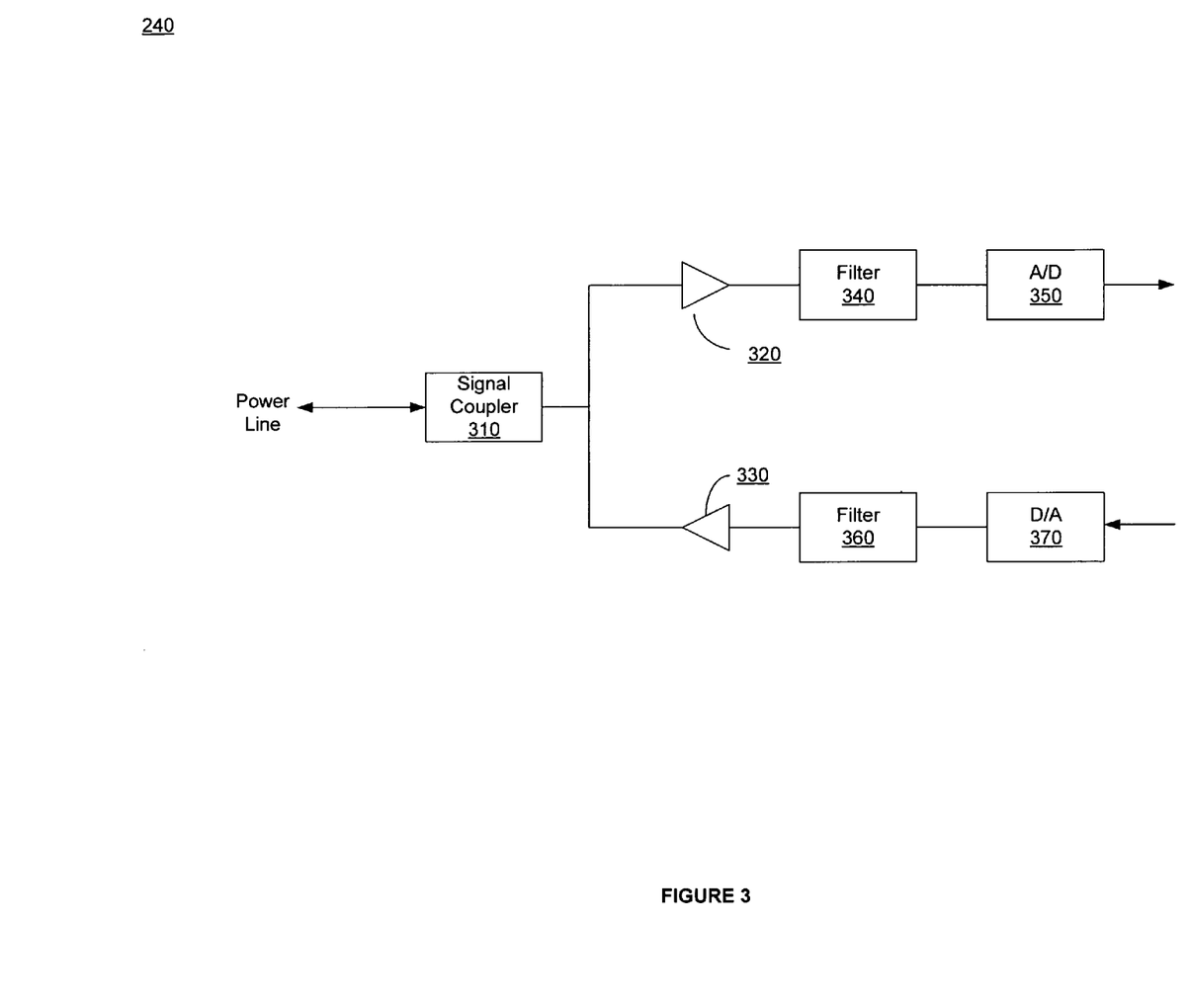
FIG. 3 shows an exemplary power line carrier interface for receiving a software patch in accordance with one embodiment of the present invention.

Referring now to FIG. 3, an exemplary power line carrier interface 240 for receiving a software patch in accordance with one embodiment of the present invention is shown. The power line carrier interface 240 may comprise a passive signal coupler 310 coupled to a first and a second path. The first path may convert the analog signal to a digital signal input for the television set 200 while the second path may convert digital signals from the television set 200 to analog signals operable for transmission over the power line 190.

According to one embodiment, the passive signal coupler 310 may transfer data signals over alternative current (AC) power line 190. In one example, each leg of the passive signal coupler 310 coupled to a phase of the power line voltage 190 may include a series LC circuit that is operable to tune to the data signal carrier frequencies as set by the sub-carriers of the OFDM modulation in one example.

The passive signal coupler 310 may be coupled to an amplifier 320 for amplifying the data signal (e.g., software patch). The amplified signal may be supplied to a filter 340 for filtering noise and other signal interferences. Furthermore, the filtered data signal may be converted to a digital signal using an analog to digital converter 350. As such, the digital signal for the software patch received may now be used by the CPU 280 and the memory component 270 of the television set 200.

According to one embodiment, the television set 200 may respond to the receipt of the software patch. For example, the television set 200 may respond and notify the patch provider 170 that a properly authenticated software patch has been received. As such, the digital signal response indicating the receipt of the properly authenticated software patch may be converted to an analog signal using a digital to analog component 370. The analog response signal may then be filtered using a filter 360 and amplified using an amplifier 330. As a result, the amplified signal may now be transmitted to the patch provider 170. It is appreciated that OFDM scheme may similarly be used by the television set 200 before sending the response signal to the patch provider 170 over the power line 190.

Figure 4:
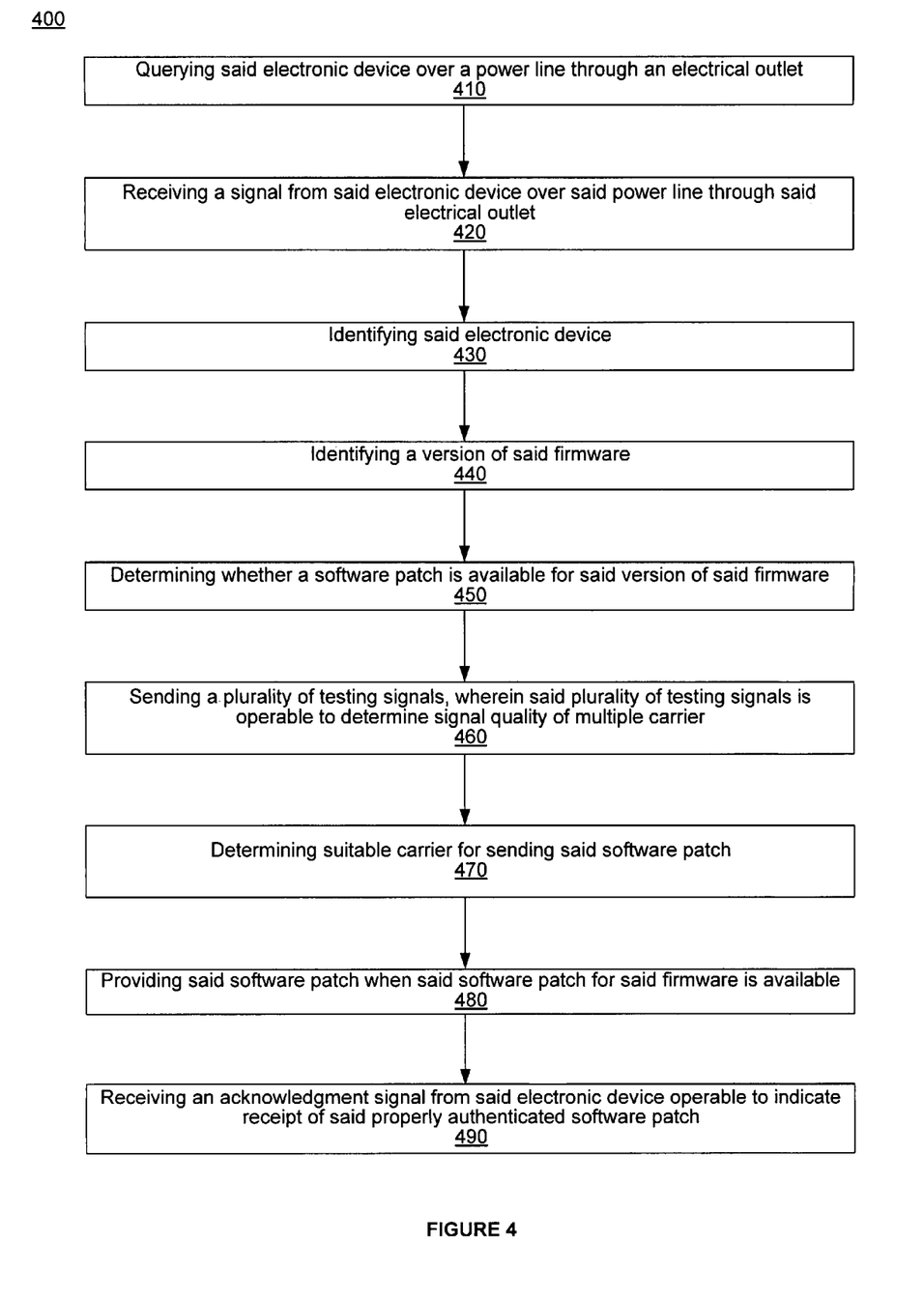
FIG. 4 shows an exemplary flow diagram for providing a software patch to an electronic device in accordance with one embodiment of the present invention.

Referring now to FIG. 4, an exemplary flow diagram 400 for providing a software patch to an electronic device in accordance with one embodiment of the present invention is shown. At step 410, the patch provider 170 may send a query to an electronic device (e.g., a television set, a set-top-box and etc.) over a power line through an electrical outlet. The query signal is operable to identify the electronic device, e.g., the television set that needs a software patch for its software/firmware.

At step 420, in response to the query, the television set 200 may send a response signal over the power line to the electrical outlet that the patch provider 170 is connected to. As a result, at step 430 the patch provider 170 may identify the electronic device, in this example the television set 200, as the electronic device that requires the software patch. Optionally at step 440, the patch provider 170 may determine the version of the firmware/software being used by the television set 200. As a result, at step 450, the patch provider 170 is operable to determine whether a software patch is available for the version of the firmware already installed on the television set 200. In one embodiment, upgrading firmware may allow rolling versions backward if needed.

Accordingly, when the most updated firmware is installed on the television set 200, the patch provider 170 may abort the process since no software patch is available. However, when the patch provider 170 determines that the firmware of the television set 200 is old and that a software patch for the firmware is available, the patch provider 170 may send the software patch.

At step 460, at least one test signal commonly known as a tone signal may be sent over the power line 190 via the electrical outlet 180 in order to determine the characteristics of the power line 190. For example, the tone signal may be used to determine the quality of multiple sub-carriers to be used for OFDM modulation scheme. According to one embodiment, at step 470 at least one suitable sub-carrier is determined for sending the software patch over the power line 190 using the electrical outlet 180.

According to one embodiment, the suitability and the quality of the power line 190 may be determined using the signal to noise ratio of the tone signals. As a result, a suitable and a higher quality sub-carrier may be determined to transmit the software patch over. In one example, the OFDM scheme may be used. Moreover, for a higher quality sub-carrier (e.g., higher signal to noise ratio) a higher density modulation scheme may be used. For example, 256 QAM modulation may be used instead of a BPSK modulation for higher quality sub-carriers.

At step 480, the software patch may be modulated based on the selected sub-carriers and the modulation scheme and transmitted from the patch provider 170 over the power line 190 via the electrical outlet 180. It is appreciated that a tone signal may be transmitted at regular intervals to determine the suitability of sub-carriers being used. As a result, different sub-carriers may be used if the power line 190 channel characteristics changes. In one embodiment, optionally at step 490 an acknowledgement signal may be received from the television set 200 indicating that a properly authenticated software patch has been received.

It is appreciated that most appliances have an interface and means for communicating over a power line (e.g., a modem). However, older appliances may not be equipped for communication over a power line. In situations where the appliance is not equipped to communicate over a power line, an adaptor dongle may be used. As a result, the owner of the appliance may connect the adaptor dongle to the AC outlet inside the home. A technician may thereafter supply the software patch by connecting to an outlet outside of the home. Therefore, a patch may be provided without the need to have the owner of the appliance present.

As a result, firmware and software programs used by various electronic components may now be updated without requiring the technician to have physical access to the device.

Moreover, software patches and updates may now be supplied to various electronic devices without the use of the Internet utilizing conventional methods (e.g., DSL, Cable and etc.). Furthermore, software patches are now available through a power line at high frequencies and with high data rate.

Figure 5:
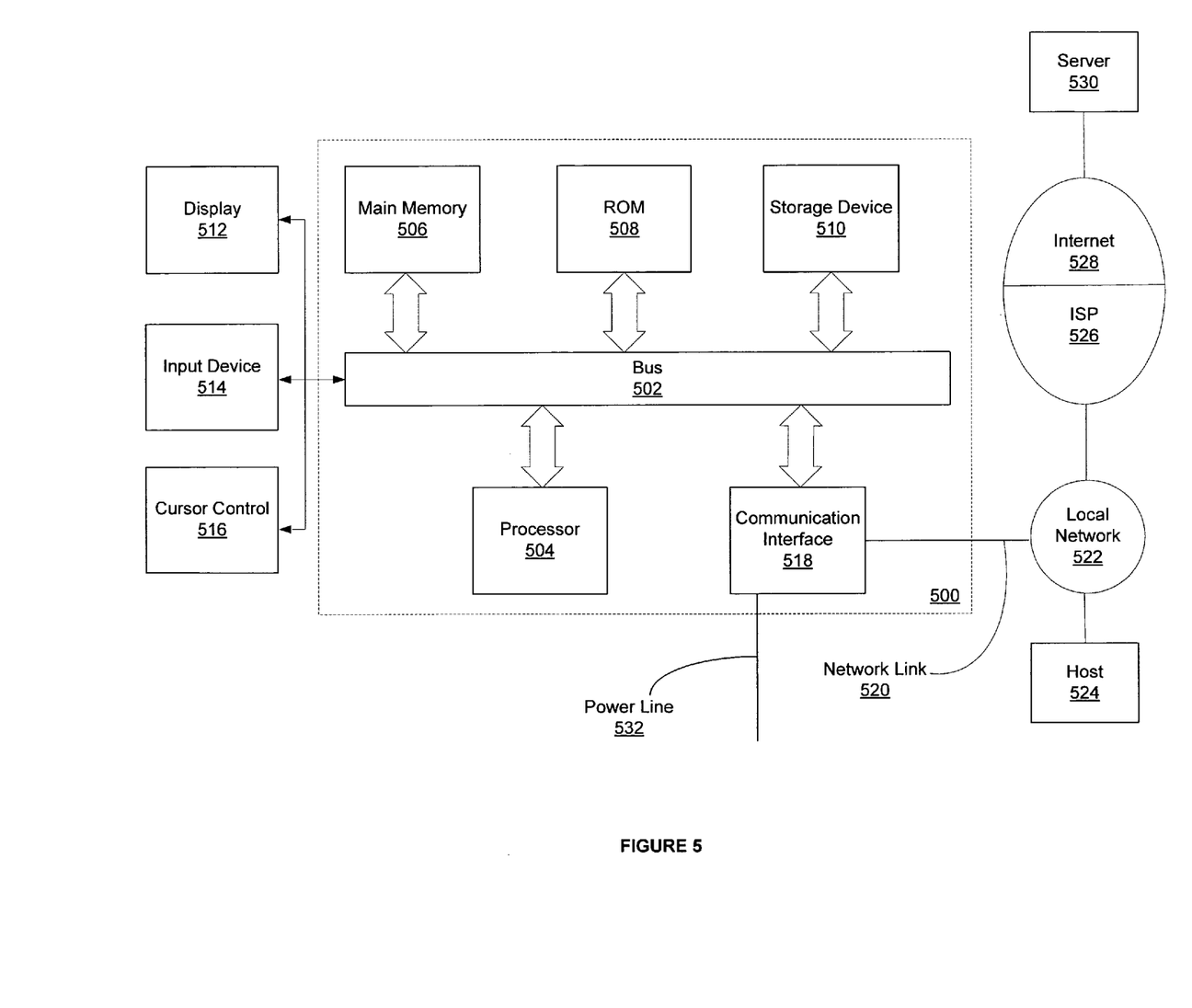
FIG. 5 illustrates a general purpose device that may serve as a platform for providing a software patch to an electronic device in accordance with embodiments of the present invention.

FIG. 5 is a block diagram that illustrates a general purpose device 500 upon which an embodiment of the invention may be implemented. General purpose device 500 may implement the method for providing a software patch to an electronic device via a power line through an electronic outlet as shown in FIGS. 1-4 and includes a bus 502 or other communication mechanism for communicating information, and a processor 504 coupled with bus 502 for processing information.

General purpose device 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. General purpose device 500 further includes a read only memory (ROM) 508 or other static storage device coupled to bus 502 for storing static information and instructions for processor 504. A non-volatile storage device 510, such as a magnetic disk or optical disk, is provided and coupled to bus 502 for storing information and instructions.

General purpose device 500 may be coupled via bus 502 to an optional display 512, such as a cathode ray tube (CRT), a liquid crystal display (LCD), etc., for displaying information to a computer user. An optional input device 514, including alphanumeric and other keys, may be coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512.

The term "computer-readable medium" as used herein refers to any medium that participates in providing instructions to processor 504 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

In one embodiment, the general purpose device 500 may be operable to send and receive messages through the network (s), network link 520 and communication interface 518. In the Internet example, a server 530 might transmit a requested code for an application program through Internet 528, ISP 526, local network 522 and communication interface 518. The received code may be executed by processor 504 as it is received, and/or stored in storage device 510, or other non-volatile storage for later execution. It is appreciated that the coupling of the general purpose device 500 through the network link 520 to other components (e.g., the server 530) is exemplary. As such, the embodiments of the present invention may be practiced without coupling through the network link 520.

It is appreciated that the general purpose device 500 is operable to send and receive messages via an electrical outlet to a power transmission line 532. For example, the general purpose device 500 may send a test signal via the power transmission line 532. The general purpose device 500 may use a response message from the power line 532 to determine at least one suitable sub-carrier frequency for sending a software patch. As a result, the software patch for an electronic device (e.g., television and set-top-box) as discussed above may be transmitted via the power transmission line 532.

In the foregoing specification, embodiments of the invention have been described with reference to numerous specific details that may vary from implementation to implementation. Thus, the sole and exclusive indicator of what is, and is intended by the applicants to be, the invention is the set of claims that issue from this application, in the specific form in which such claims issue, including any subsequent correction. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method of providing software patch to an electronic device comprising:
   querying said electronic device over a power line plugged into a first electrical outlet;
   in response to said querying, receiving a signal from said electronic device over said power line through said first electrical outlet, wherein said signal is used to determine if said software patch is applicable to said electronic device;
   in response to said receiving, using said signal to identify said electronic device; and
   in response to said identifying, sending updated signals to said electronic device over said power line through said first electrical outlet via a second electrical outlet, wherein said electronic device obtains said software patch from said updated signals, wherein said software patch is used to update a firmware on said electronic device, and wherein said first electrical outlet is on an external portion of a building structure and said building structure comprises said second electrical outlet.

2. A method as described in claim 1, wherein said electronic device is selected from a group consisting of a television set and a set-top-box.

3. A method as described in claim 1 further comprising:
   in response to said receiving, identifying a version of said firmware;
   determining whether a software patch is available for said version of said firmware; and
   in response to said determining, providing said software patch when said software patch for said firmware is available.

4. A method as described in claim 1 further comprising:
   sending a plurality of test signals, wherein said plurality of test signals is operable to determine signal quality of multiple carrier; and
   in response to said sending said plurality of test signals, determining suitable carrier for sending said software patch.

5. A method as described in claim 4, wherein said signal quality of said multiple carriers is determined based on a signal to noise ratio of carriers.

6. A method as described in claim 1, wherein said sending uses an orthogonal frequency division multiplexing (OFDM) for sending said software patch.

7. A method as described in claim 1 further comprising:
receiving an acknowledgment signal from said electronic device operable to indicate receipt of said software patch.

8. Apparatus for providing software patch to an electronic device comprising:
means for querying said electronic device over a power line plugged into a first electrical outlet;
in response to said querying, means for receiving a signal from said electronic device over said power line through said first electrical outlet, wherein said signal is used to determine if said software patch is applicable to said electronic device;
in response to said receiving, means for identifying, using said signal, said electronic device; and
in response to said identifying, means for sending updated signals to said electronic device over said power line through said first electrical outlet via a second electrical outlet, wherein said electronic device obtains said software patch from said updated signals, wherein said software patch is used to update a firmware on said electronic device, and wherein said first electrical outlet is on an external portion of a building structure and said building structure comprises said second electrical outlet.

9. The apparatus as described in claim 8, wherein said electronic device is selected from a group consisting of a television set and a set-top-box.

10. The apparatus as described in claim 8 further comprising:
in response to said receiving, means for identifying a version of said firmware;
means for determining whether a software patch is available for said version of said firmware; and
in response to said determining, means for providing said software patch when said software patch for said firmware is available.

11. The apparatus as described in claim 8 further comprising:
means for sending a plurality of test signals, wherein said plurality of test signals is operable to determine signal quality of multiple carrier; and
in response to said sending said plurality of test signals, means for determining suitable carrier for sending said software patch.

12. The apparatus as described in claim 11, wherein said signal quality of said multiple carriers is determined based on a signal to noise ratio of carriers.

13. The apparatus as described in claim 8, wherein said sending uses an orthogonal frequency division multiplexing (OFDM) for sending said software patch.

14. The apparatus as described in claim 8 further comprising:
means for receiving an acknowledgment signal from said electronic device operable to indicate receipt of said software patch.

15. A system for providing software patch to an electronic device comprising:
a device that stores said software patch, wherein said device is plugged into a first electrical outlet to provide said software patch to said electronic device over a power line via a second electrical outlet, and wherein said device queries said electronic device to identify said electronic device, wherein said device receives a signal from said electronic device, wherein said signal is used to determine if said software patch is applicable to said electronic device, wherein said device identifies said electronic device using said signal, and wherein said software patch is used to update a firmware on said electronic device; and
said electronic device coupled to said device, wherein said electronic device receives updated signals from said device over said power line, wherein said electronic device obtains said software patch from said updated signals transmitted over said power line, and wherein said first electrical outlet is on an external portion of a building structure and said building structure comprises said second electrical outlet.

16. The system as described in claim 15, wherein said device is further operable to send a test signal from said first electrical outlet over said power line, and wherein said device is further operable to determine suitable carriers for sending said software patch.

17. The system as described in claim 16, wherein said suitable carriers are determined based on a signal to noise ratio carriers.

18. The system as described in claim 15, wherein said device sends said software patch over said power line using orthogonal frequency division multiplexing (OFDM).

19. The system as described in claim 15, wherein said electronic device is operable to send an acknowledgment signal over said power line indicating receipt of said software patch.

20. The system as described in claim 15, wherein said electronic device is selected from a group consisting of a television set and a set-top-box.

21. The system as described in claim 15, wherein said device is further operable to identify a version of said firmware on said electronic device, and further operable to determine whether said software patch should be provided to update said firmware on said electronic device.

* * * * *